Aug. 26, 1941.     C. LYNN     2,254,043
MOTOR CONTROL SYSTEM
Filed Dec. 21, 1939
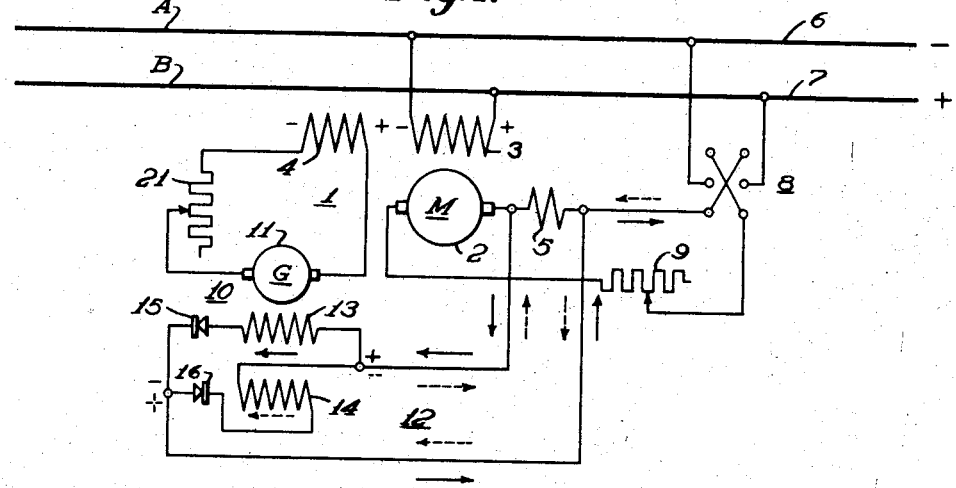
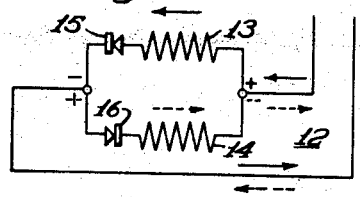
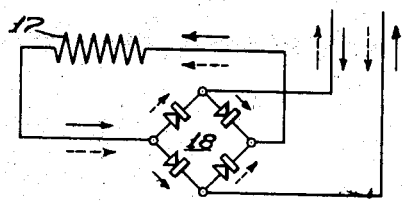
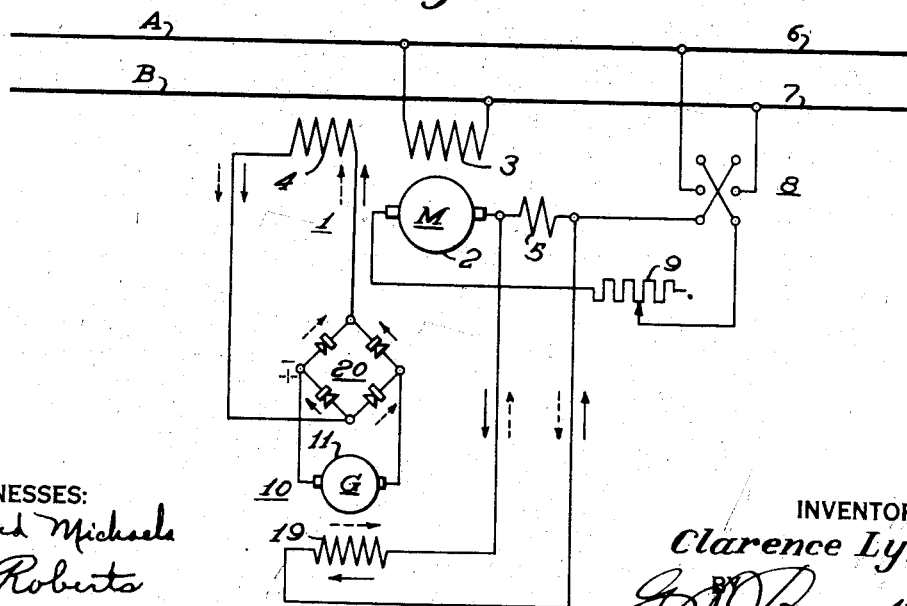
WITNESSES:
INVENTOR
Clarence Lynn
BY
ATTORNEY Patented Aug. 26, 1941

2,254,043

UNITED STATES PATENT OFFICE 2,254,043

MOTOR CONTROL SYSTEM

Clarence Lynn, Pittsburgh, Pa., assignor to Westinghouse Electric & Manufacturing Company, East Pittsburgh, Pa., a corporation of Pennsylvania Application December 21, 1939, Serial No. 310,397

4 Claims. (Cl. 172—239)

My invention relates, generally, to motor control systems, and more particularly, to systems for controlling the excitation of relatively large dynamo-electric machines, such, for example, as direct current motors of the reversing type.

Large direct current compound motors which are used for driving reversing rolling mills and the like are usually controlled, both as regards speed and direction of operation, by controlling the polarity and amount of voltage of the supply generator or source in a well known manner. Voltage control of motors of this kind requires that some provision be made for maintaining the polarity of the series or compounding field winding the same as the main or shunt field winding for either direction of operation of the motor. This has been accomplished in the past by providing the motor with a wire-wound compounding field winding, as distinguished from a strap-wound series field winding connected in the armature circuit, and utilizing a series field winding connected in the armature circuit, and utilizing a series exciter to energize the compounding field winding.

The usual practice is to connect the compounding field winding of the motor across the armature of the series exciter and excite the field winding of the exciter in accordance with the load or armature current of the motor by connecting it across an armature shunt or an interpole field winding to be responsive to the voltage drop thereacross. The polarity of the compounding field winding was then maintained the same as the main field winding by connecting a suitable reversing switch between the exciter and the compounding field winding and controlling the reversing switch in accordance with the reversals of the voltage applied to the motor armature. The use of a reversing switch for this purpose, together with the necessary amount of auxiliary control apparatus to operate it in conjunction with the main voltage control apparatus of the generator or supply source, complicates the control, makes it more expensive, and increases the possibilities for trouble occurring during normal operation of the equipment.

Accordingly, it is an object of my invention, generally stated, to provide for controlling the excitation of a direct current motor of the reversing type in a simple, reliable and economical manner.

A more specific object of my invention is to provide for automatically maintaining the desired polarity of the compounding field winding of a direct current motor regardless of its direction of operation as determined by armature voltage control.

A more specific object of my invention is to provide for utilizing a series exciter in a motor control system of the character described which shall function to maintain the proper polarity of the compounding field winding of the motor regardless of the direction of operation of the motor without utilizing a reversing switch in the armature circuit of the exciter.

Another object of my invention is to provide a motor control system of the character described wherein a predetermined polarity of the armature voltage of the series exciter is automatically maintained regardless of reversals of the voltage applied to the motor armature without the use of auxiliary control of any kind between the series exciter and the main voltage control of the supply generator or source.

A further object of my invention is to provide, in a motor control system of the character described, for maintaining the desired polarity of the compounding field winding of the motor by utilizing a series exciter provided with a plurality of field windings, the selective energization of which is controlled by rectifier means connected in circuit relation therewith.

Another object of my invention is to provide, in a motor control system of the character described, for maintaining the desired polarity of the compounding field winding of the motor by utilizing rectifier means in the circuit between the compounding field winding and the armature of the series exciter and providing the exciter with a single field winding.

A still further object of my invention is to provide for maintaining the desired polarity of the compounding field winding by utilizing a series exciter with a single field winding and connecting the single field winding to the armature circuit of the motor through rectifier means.

These and other objects of my invention will become more apparent from the detailed specification to follow, when considered in conjunction with the accompanying drawing, in which:

Figure 1 is a diagrammatic view of a motor control system constituting a preferred embodiment of my invention;

Figs. 2 and 3 are modifications of the exciter field system shown in Fig. 1; and Fig. 4 is still another modification of the embodiment shown in Fig. 1.

Referring now to Figure 1, a direct current compound motor 1 is provided with an armature 2, and a shunt field winding 3. The motor 1 is also provided with a series or compounding field winding 4 and a commutating field winding 5. The shunt field winding 3 may be excited from a suitable source of direct current power represented by conductors A and B.

It is well known that the direction of rotation of a motor of this type may be controlled either by reversing the excitation current of the shunt field winding of the motor or by reversing the direction of the current through the armature circuit of the motor. From a practical standpoint however, the general practice is to control the direction of operation of such motors by reversing the direction of the current flow in the armature circuit, which is usually accomplished by supplying the motor with power from a generator provided with suitable control to reverse its polarity. In order to simplify the drawing the armature 2 of the motor is shown connected to a power source represented by conductors 6 and 7 through a reversing switch 8 and a variable resistor 9. The reversing switch 8 represents a means for reversing the voltage applied to the motor armature and the variable resistor 9 represents a means to vary the amount of applied voltage.

In this embodiment of the invention a direct current exciter 10, which may be driven in any suitable manner is utilized to energize the compounding field winding 4 of the motor 1 and is provided with an armature 11 and a field system 12 comprising two field windings 13 and 14. To permit the field circuits to be energized alternately, rectifiers 15 and 16 are utilized in series-circuit relation with the field windings 13 and 14, respectively. Although rectifiers 15 and 16 are so connected that they pass current in opposite directions the connections to each of the field circuits are such that current is permitted to pass through each circuit in the same direction.

In order to energize the field system 12 of the exciter 10 in proportion to the amount of current traversing the armature circuit of the motor 1, it may be connected in shunt-circuit relation with the commutating or interpole field winding 5 of the motor. It will be understood, however, that the same desired results may be likewise obtained by utilizing the potential drop across a suitable shunt placed in series with the armature circuit of the motor or by any other suitable means. A variable resistance 21 may be utilized between the compounding field winding 4 and the exciter armature 10 to adjust the current in the field circuit to the desired value.

In describing the operation of the system it may be assumed that the motor 1 is rotating in a clockwise direction and that the current is traversing the armature circuit of the motor in the direction indicated by the solid arrows in Fig. 1. A drop in potential across the commutating field winding 4 of the motor is thus obtained and such potential is impressed on the field system 12 of the exciter 10. As hereinbefore explained, the rectifier elements 15 and 16 are connected to permit current flow in directions opposite to each other and, accordingly, when current flows in the field system 12 in the direction indicated by the solid arrows, it will pass only through rectifier 15 and the field winding 13, thereby producing an exciter potential of a polarity as indicated in Fig. 1. Since the exciter is driven at a constant speed, the output potential thereof varies substantially in proportion to the amount of load current flowing in the armature circuit of the motor 1.

When the motor 1 is reversed by actuating the reversing switch 8 to its opposite position, thereby reversing the polarity of the potential applied to the armature 2, current will obviously pass through the armature circuit of the motor 1 in the opposite direction, as indicated by the dotted arrows. Under these circumstances, the polarity of the potential drop across the commutating field winding 5 will also be reversed and current will flow into the field system 12 of the exciter 10, in the direction indicated by the dotted arrows. As heretofore explained, current will now pass only through the rectifier 16 and field winding 14 due to the blocking action of the rectifier 15.

However, since the connections to field winding 14 are opposite to those of field winding 13, the current will flow through field winding 14 in the same direction as current flows through the field winding 13, and produces a flux in the same direction as that produced by the field winding 13. Accordingly, the polarity of the potential produced at the armature terminals of the exciter 10 for counterclockwise rotation of the motor will be the same as that produced when the motor is rotated in a clockwise direction.

Since the polarity of the potential of the exciter 10 remains fixed for both directions of motor rotation, it follows that the current for energizing the compounding field winding 4 will flow in a fixed direction therethrough irrespective of the direction in which the motor is rotating, thereby maintaining the desired fixed directional relationship between the fluxes of the shunt field 3 and series field 4 of the motor 1.

In Fig. 2, which is a modification of the system of Fig. 1, I have again employed two separate field windings 13 and 14. However, the field windings 13 and 14 of the exciter 10 are wound in opposite directions to each other. Hence, although the current will now flow alternatively through the field circuits 13 and 14 in opposite directions in accordance with the direction in which the motor 1 is rotating, the direction of flux produced by each of said fields will be the same.

In Fig. 3, the two field windings 13 and 14 of the field system 12 of the exciter 10 shown in Figs. 1 and 2 have been replaced by a single field winding 17. A plurality of rectifiers 18 are connected in the well known "bridge" circuit arrangement and are connected between the field winding 17 of the exciter 10 and the field winding 5 of the motor 1, and are effective to permit the flow of current through the field winding 17 in one direction only, irrespective of the direction in which current is flowing in the armature circuit of the motor.

In Fig. 4, as in Fig. 3, the field system of the exciter 10 comprises a single field winding 19 which is connected across the field winding 5 of the motor 1 for energization therefrom in proportion to the current flowing in the armature circuit of said motor. It will be apparent that when the direction of current flow in the motor armature is reversed to obtain rotation thereof in an opposite direction, the polarity of the potential applied to the field winding 19 of the exciter 10 will also be reversed. As hereinbefore explained, the exciter is run in a fixed direction, and the polarity of the potential at the armature terminals of the exciter 10 will likewise be reversed in accordance therewith. In order that the compounding field winding 4 be energized in a fixed direction which obviously requires a potential therefor of fixed polarity, I have provided a plurality of rectifiers 20 which are arranged in "bridge" circuit relation and connected between the armature terminals of the exciter 10 and the field winding 4 thereby maintaining a current flow through the field winding in one direction only irrespective of the direction in which the motor 1 is rotating.

In conclusion, it will be appreciated that I have provided a novel and improved means for exciting the compounding field winding of a direct current compound motor of the reversing type which eliminates the necessity for utilizing a reversing switch of any kind in the armature circuit of the series exciter thereby eliminating all moving parts subject to wear and effecting an increase in service efficiency of the motor control system.

It will be evident that various modifications may be made in the various embodiments of my invention without departing from the spirit and scope thereof and I desire that only such limitations as are necessitated by the prior art be placed thereon.

I claim as my invention:

1. The combination of a reversible compound motor having an armature, a separately excited main field winding and a separately excited compounding field winding, an exciter means for supplying current to said compounding field winding, said exciter having a field circuit including means for obtaining energization thereof in proportion to the flow of current in the armature circuit of said motor, and rectifier means connected in circuit relation with said exciter field circuit for effecting a unidirectional current flow in said exciter field circuit to maintain a predetermined polarity of the output potential thereof irrespective of the direction of flow of current in the armature circuit of said motor.

2. The combination with a reversible compound motor apparatus having separately excited shunt and compounding field windings and an armature circuit including means for reversing the current flow in said armature circuit for obtaining rotation of said motor in both directions, of an exciter for energizing said compounding field winding, the field circuit of said exciter being connected for energization in proportion to said motor armature current and including a plurality of rectifiers connected in bridge circuit relation therewith to effect a unidirectional current flow in said exciter field circuit and thereby maintain an output potential of fixed polarity on said exciter irrespective of the direction of current flow in said motor armature circuit.

3. In combination, a compound direct current motor having a separately excited main shunt field winding, a compounding field winding, and a commutating field winding connected in series circuit relation with its armature circuit, an exciter for energizing said compounding field winding, said exciter having a field circuit connected in parallel across said commutating field winding of the motor, and rectifier means disposed in circuit relation between said exciter field circuit and said commutating field winding to effect unidirectional current flow in said exciter field for both directions of current flow in said motor armature circuit, thereby to maintain an output potential of fixed polarity on said exciter for both directions of rotation of said motor.

4. In combination, a compound direct current motor having a separately excited main field winding of fixed polarity, a compounding field winding, and a commutating field winding connected in series circuit relation with its armature circuit, an exciter for energizing said compounding field winding, said exciter having a field circuit connected in parallel across said comutating field winding of the motor, and rectifier means arranged in bridge circuit relation and connected in series between said exciter field circuit and said commutating field winding to effect unidirectional current flow in said exciter field circuit for both directions of current flow in said motor armature circuit, thereby to maintain an output potential of fixed polarity on said exciter for both directions of rotation of said motor.

CLARENCE LYNN.